(12) United States Patent
Cumeralto et al.

(10) Patent No.: US 7,317,404 B2
(45) Date of Patent: Jan. 8, 2008

(54) METHOD AND APPARATUS FOR COLLECTING AND DISPLAYING CONSUMPTION DATA FROM A METER READING SYSTEM

(75) Inventors: Scott Cumeralto, Spokane, WA (US); Richard DeVries, Spokane, WA (US)

(73) Assignee: Itron, Inc., Spokane, WA (US)

( * ) Notice: Subject to any disclaimer, the term of this patent is extended or adjusted under 35 U.S.C. 154(b) by 190 days.

(21) Appl. No.: 11/036,170

(22) Filed: Jan. 13, 2005

(65) Prior Publication Data

US 2005/0190074 A1 Sep. 1, 2005

Related U.S. Application Data

(60) Provisional application No. 60/536,419, filed on Jan. 14, 2004.

(51) Int. Cl.
*G08B 23/00* (2006.01)
(52) U.S. Cl. .................. 340/870.02; 340/870.03; 702/60; 705/412
(58) Field of Classification Search .......... 340/870.02, 340/870.03; 705/412; 702/60
See application file for complete search history.

(56) References Cited

U.S. PATENT DOCUMENTS

| | | | |
|---|---|---|---|
| 4,058,768 A | 11/1977 | Milkovic | |
| 4,600,923 A | 7/1986 | Hicks et al. | |
| 4,803,632 A * | 2/1989 | Frew et al. | 705/412 |
| 5,056,107 A | 10/1991 | Johnson et al. | |
| 5,214,587 A * | 5/1993 | Green | 702/60 |
| 5,278,551 A * | 1/1994 | Wakatsuki et al. | 340/870.02 |
| 5,635,895 A * | 6/1997 | Murr | 340/538.11 |
| 5,644,090 A | 7/1997 | Spendel | |
| 5,926,776 A | 7/1999 | Glorioso et al. | |
| 6,081,204 A | 6/2000 | Lacoie et al. | |
| 6,429,642 B1 | 8/2002 | Rodilla Sala et al. | |
| 6,531,863 B1 | 3/2003 | Garalapuraiaha et al. | |
| 6,556,142 B2 * | 4/2003 | Dunstan | 340/606 |
| 6,904,385 B1 | 6/2005 | Budike, Jr. | |
| 6,956,500 B1 * | 10/2005 | Ducharme et al. | 340/870.02 |
| 6,985,087 B2 * | 1/2006 | Soliman | 340/870.02 |
| 7,039,532 B2 | 5/2006 | Hunter | |
| 7,069,161 B2 | 6/2006 | Gristina et al. | |
| 7,098,783 B2 | 8/2006 | Crichlow | |
| 7,126,494 B2 | 10/2006 | Ardalan et al. | |

\* cited by examiner

*Primary Examiner*—Albert K. Wong
(74) *Attorney, Agent, or Firm*—Patterson, Thuente, Skaar & Christensen, P.A.

(57) ABSTRACT

A method and an apparatus for collecting and displaying real-time utility consumption data and an estimate of utility costs from various utility metering modules upon request by the consumer within the comfort of their own home or business. According to one aspect of the invention, a utility display module is in communication with a utility end point device that monitors and displays consumption of a utility (water, gas, and/or electricity). The source of the data received by the module may be generated by utility meter transmitters that are attached to the various utility delivery end points or meters. In a related embodiment, a repeater may be used with a battery powered energy display module to make the module transportable.

41 Claims, 17 Drawing Sheets

| Program Location | Switch 1 (UP) | Switch 2 (MENU) | Switch 3 (GO) | Switch 4 (Down) |
|---|---|---|---|---|
| Main | | Display 1st Menu Option | | |
| Menu | Display Next Menu Option | Display Next Menu Option | Do the Current Displayed Menu Option | Display Previous Menu Option |
| Display Menu Option | Next Field | Next Field | Next Field or Exit | Previous Field |
| Select Menu Option | Next Selection | Next Selection | Select | Previous Selection |
| Modify Menu Option | Increment Value | Next Field or Next Digit | Next Field Confirmation or Save and Exit | Decrement Value |
| Configuration Display | Accept Value | | | Reenter Value |

FIG. 5B

METHOD AND APPARATUS FOR COLLECTING AND DISPLAYING CONSUMPTION DATA FROM A METER READING SYSTEM

RELATED APPLICATIONS AND CLAIM TO PRIORITY

This application claims priority to U.S. Provisional Patent Application No. 60/536,419, filed on Jan. 14, 2004, and entitled "A Method and Apparatus for Collecting and Displaying Consumption Data from a Meter Reading System," which is herein incorporated by reference in its entirety. In addition, this application incorporates by reference in its entirety, U.S. patent application Ser. No. 10/965,283, filed Oct. 14, 2004, entitled "Consumptive Leak Detection System."

FIELD OF THE INVENTION

The invention relates to a method and apparatus for collecting and displaying metered data from remote utility meters.

BACKGROUND OF THE INVENTION

Wireless automatic meter reading systems are well known. Typically, each utility meter is provided with a battery-powered encoder that collects meter readings and periodically transmits those readings over a wireless network to a central station. The power limitations imposed by the need for the encoder to be battery powered and by regulations governing radio transmissions effectively prevent direct radio transmissions to the central station. Instead, wireless meter reading systems typically utilize a layered network of overlapping intermediate receiving stations that receive transmissions from a group of meter encoders and forward those messages on to the next higher layer in the network as described, for example, in U.S. Pat. No. 5,056,107. These types of layered wireless transmission networks allow for the use of lower power, unlicensed wireless transmitters in the thousands of end point encoder transmitters that are deployed as part of a utility meter reading system for a large metropolitan area.

A challenge faced by utilities and consumers in attempting to reduce energy consumption (gas and/or electric) as well as water consumption, is the lack of access to real-time data on the part of the actual consumer of the amount of actual energy still being used once the consumer has attempted to conserve energy or preserve water consumption. For instance, it would be of value to the consumer to know the immediate economic impact of water or energy consumption (gas and/or electric) once the thermostat is turned down in the winter for a few hours, the lights are turned off in the basement when not in use or the impact of water conservation of foregoing watering the lawn for one day. Today's systems eventually provide this information back to the consumer, but not on command by the consumer or real-time.

Accordingly, there is a need for a system for collecting and displaying data from metering units located close to the point of use or consumption. An approach that addresses the aforementioned problems, as well as other related problems, is therefore desirable.

SUMMARY OF THE INVENTION

Various embodiments of the invention are directed to a method and an apparatus for collecting and conveniently displaying real-time data and an estimate of costs from various meter modules (e.g., metering units) upon request by the consumer within the comfort of their own home or business. The display of real-time data permits an energy (or water) consumer to make better decisions concerning energy utilization or consumption. Further, the invention can prevent or minimize unpleasant surprises on the part of the energy consumer caused by intentional or inadvertent excessive energy consumption. Continuously throughout the billing period a consumer or end user can monitor his/her energy consumption and costs and make appropriate changes to reduce expenses if they so desire. Identifying wasteful habits or assisting cost conscious end users are additional benefits of the invention.

According to one aspect of the invention, an energy display module is in communication with a utility end point device that monitors consumption of water, gas, and/or electricity. The display module provides a source of energy consumption information or data for the end user. The source of the data received by the module may be generated by special transmitters called ERTs (encoder/receiver/transmitter) that are attached to the various utility delivery and/or metering points (such as meters) and which are capable of continuously monitoring utility usage and forwarding the consumption data to the energy display module via a radio frequency link. In one embodiment, the module can display, continuously, for the user, consumption information or data along with date and time and an estimate of cost to date based on the energy (or water) utilized. The module can be used in homes and/or businesses or any other entity that consumes a utility.

In a related embodiment, through the use of a repeater, the energy display module could be operated on disposable or rechargeable batteries, thereby making the module transportable. The portability of the module permits an energy consumer to place it near a consumption device such as a user's refrigerator or other appliance. In one embodiment, the repeater may be removably mountable to a wall to gather data from the end points, via a radio frequency (or power line carrier) link. The repeater may be adapted to systematically rebroadcast the energy consumption information in such a manner as to allow battery savings for the home display module receiver. In another embodiment, the energy display receiver electronics may be integrated into a thermostat housing that retains its existing functionality while displaying consumption data in real-time.

The above summary of the invention is not intended to describe each illustrated embodiment or every implementation of the invention. The figures in the detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIG. 5B is a table illustrating operations of corresponding buttons on the energy display module.

FIG. 6C is a schematic diagram of real time clock with a battery power back-up and separate crystal according to the invention.

Figure 1:
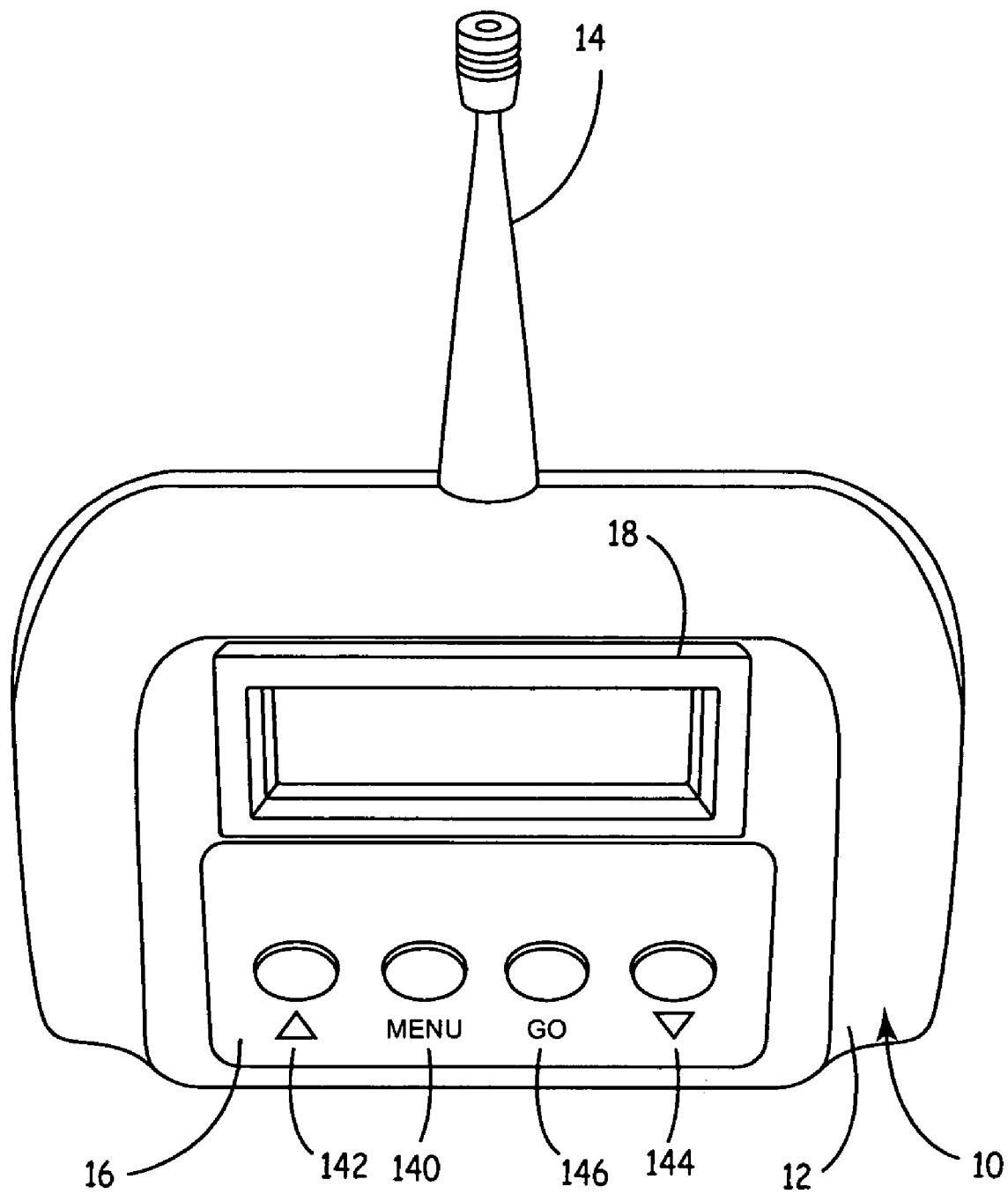
FIGS. 1 and 2, illustrate an energy display module, which can be coupled to a water pit meter, which displays consumption data according to the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF PREFERRED EMBODIMENTS

The invention is generally directed to a method and an apparatus for collecting and conveniently displaying real-time data from various utility meter modules (or metering units) by the consumer within the comfort of their own home or business. While the invention is not necessarily limited to such an application, the invention will be better appreciated using a discussion of example embodiments in such a specific context.

Figure 2:
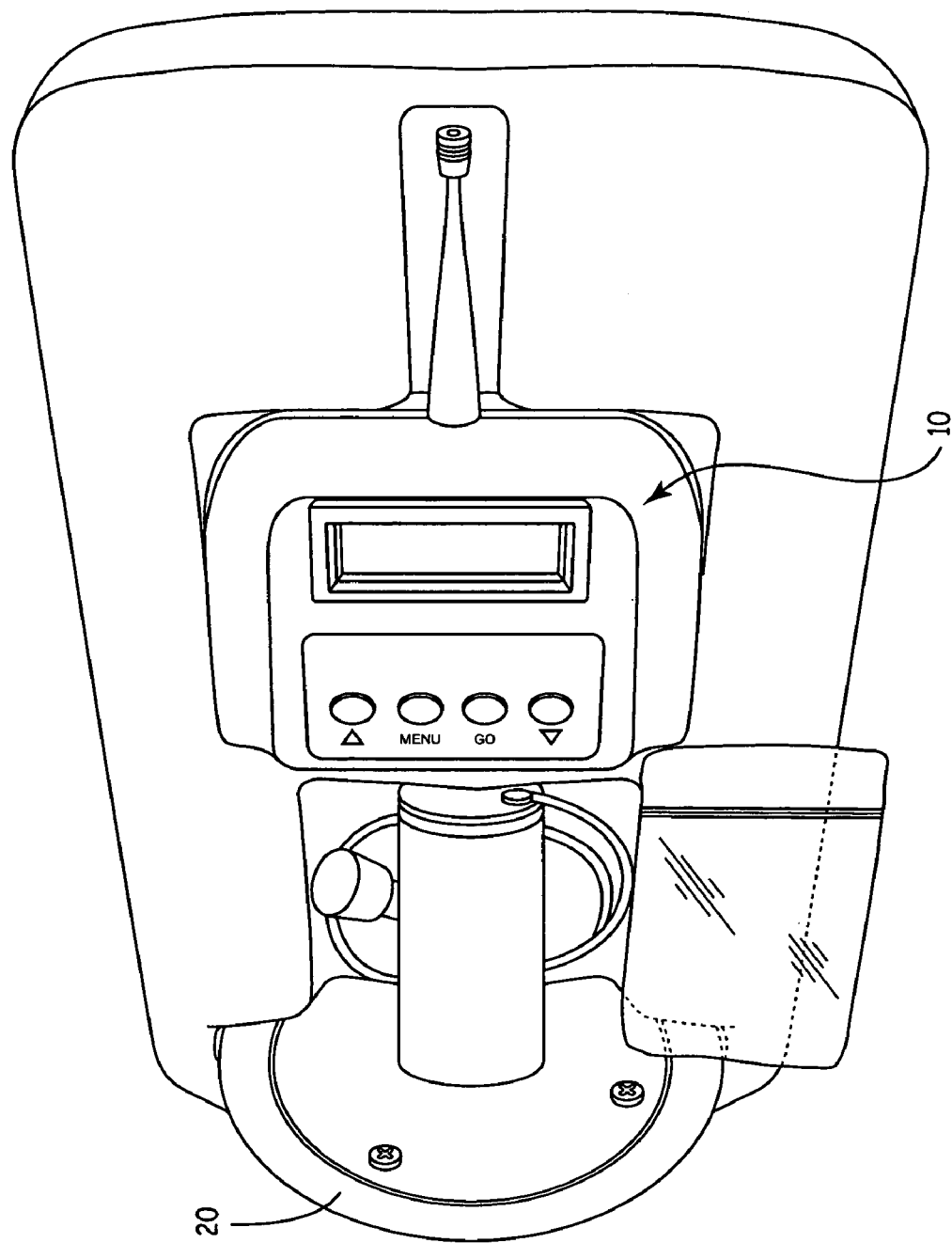

In one example embodiment, as depicted in FIGS. 1 and 2, a consumption display module 10 is illustrated that is compatible with existing ERTs as well as FCC compliant under the new Part 15.247 digital modulation rules. In this embodiment, consumption display module 10 is comprised of a housing 12 containing a radio module (not shown) that includes a generally low cost receiver and a generally low power transmitter. For an increased signal reception area, the high power transmitter may be adapted to transmit signals in the 900 Mhz frequency range. However, other frequencies common in this sector may be utilized. In another embodiment, a transceiver (not shown) may be utilized to increase the portability of consumption display module 10.

An antenna 14 is connected to the radio module for receiving and transmitting consumption information or data transmitted by the ERT. Antenna 14 may comprise a whip antenna, a patch antenna, or any other like device that facilitates reception and transmission of the consumption information. A keypad 16 and a display panel 18 are disposed on or integrated to housing 12 to permit an end user to interface with consumption display module 10. Consumption display (or home display) module 10 can also be connected to a Personal Computer (PC) for initial configuration, data extraction or for use as a Real Time data source for external application software.

Figure 3:
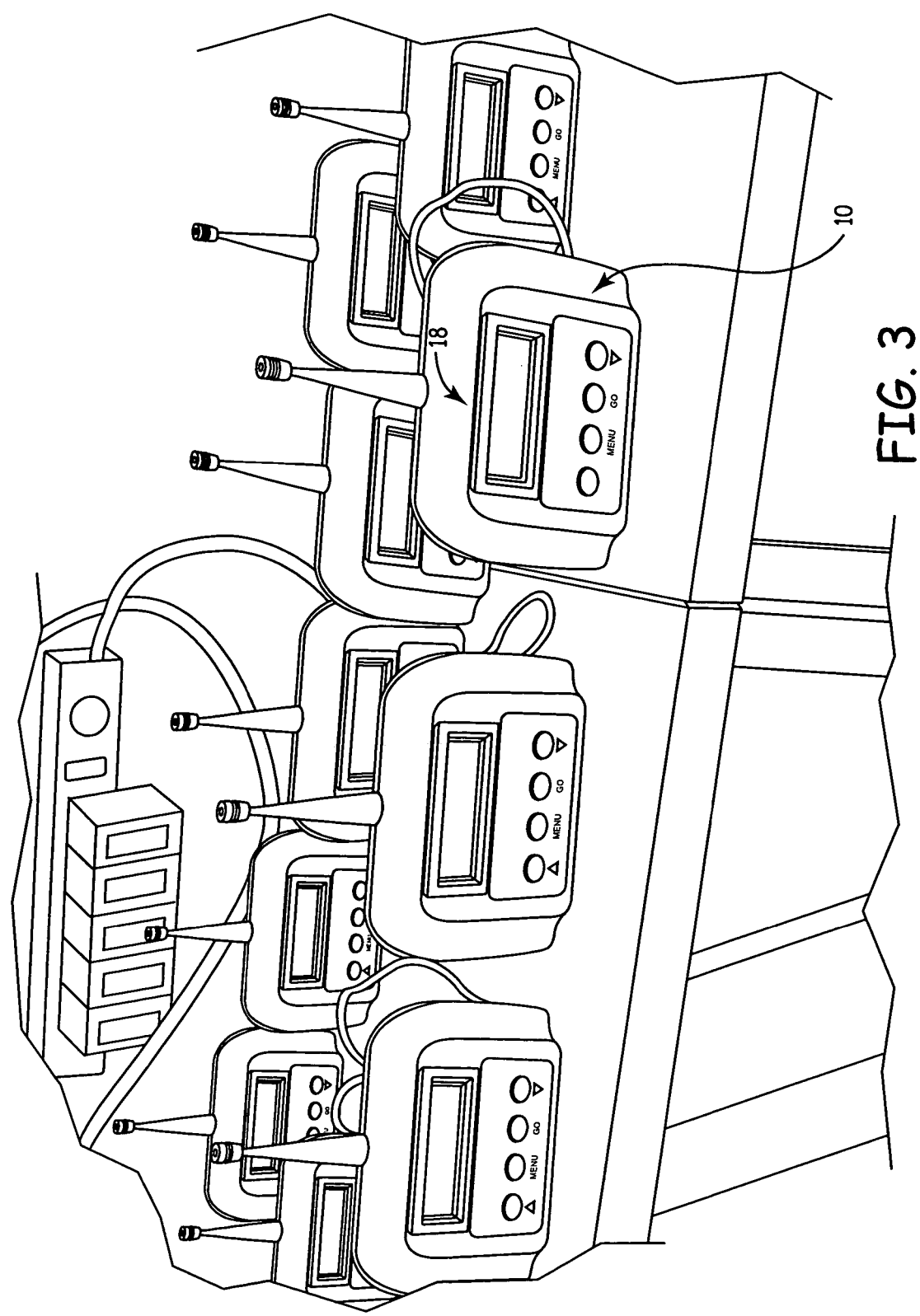
FIG. 3 illustrates the energy home module of FIG. 1 with a display of consumption data.

Referring to FIG. 3, a plurality of consumption display modules 10 display real-time consumption information according to the invention. In this example, display panel 18 is a back-lit Liquid Crystal Display (LCD). However, Light Emitting Diodes (LED) or other low cost/low energy using displays can also be used. Consumption display module 10 may be adapted to facilitate continuous LCD display of the most recently received consumption data.

Referring back to FIG. 2, consumption display module 10 is shown with a water ERT unit 20 that is adapted to monitor and display, for example, water consumption data on display panel 18. The invention is not necessarily limited to water meters and can be used in connection with gas and electricity meters that are usually provided to a consumer close to the point of use at the home or business. In addition to being able to determine total utility consumption of a home or business, consumption display module 10 may include additional Radio Frequency (RF) and/or Power Line Carrier (PLC) inputs to facilitate the transmission of utility consumption information from individual utility consuming appliances, such as pool pumps, hot water heaters, sump pumps and other like devices to energy display module 10. The ability to know the utility usage of individual appliances permits an end user to make a more informed decision on their utility consumption or usage. In another example embodiment, the RF and/or PLC inputs facilitate communication over a broadband connection and/or provide a radio interface for data communications (or ERT transmitted data), and may allow parameter changes or control of appliances.

In addition to being able to interface with ERTs, consumption display module 10 may also include the capability to interface with Residential Energy Management Systems (REMS), Mobile Data Collection Systems (Mobile), Hand Held Computers (HHC), and Fixed Networks (FN) to facilitate the transmission of utility consumption information. These interfaces also allow head-end calculations as well as tier pricing updates to be transmitted to consumption display module 10 or can be calculated locally.

With respect to the mobile (or van operated) embodiment, the consumption display module of the invention is configurable to be reset by the reader from the utility traveling in a van after the read is completed. This would start the new monthly billing cycle automatically and without customer intervention. The display module's microprocessor can also be configured to add a smoothing algorithm that would utilize that same customer's historical data to ensure that billing calculations/estimates are not calculated just from the first few days of data from the month, thereby generating an improper estimate. For instance, the customer may exhibit a historical average of 500 gallons of monthly water consumption, but the first day after the meter is read and reset by the utility the customer decides to fill his pool or spa and utilizes 6K-10K gallons of water. The microprocessor uses the smoothing algorithm to pull historical water usage data and averages same with the current high usage to level out billing for the rest of the month.

In an example embodiment, consumption display module 10 has the capability of storing at least one year's worth of 15-minute time-of-use storage data or other forms of data generated by the ERT and/or individually monitored appliances. An end user may utilize keypad 16 and display panel 18 to review the stored time-of-use storage data. Consumption display module 10 may also be capable of sampling energy use on specific feed lines for accurate projection to determine if a feeder upgrade is required. Consumption display module 10 incorporates a full transceiver to accomplish the above functional requirements.

In a related embodiment, consumption display module 10 is appliance (e.g., refrigerator) mountable where the repeater functionality is extracted and placed nearby (such as in a wall repeater discussed below). In this modified form factor, consumption display module 10 can now be a magnet-mounted device (or other monitoring systems, such as adhesive or hook and loop fastener systems). With respect to battery operation, battery life can be extended where intermittent duty cycle is implemented. In another embodiment, the energy display receiver electronics may be integrated into a thermostat housing that retains the thermostat's existing functionality.

Figure 4A:
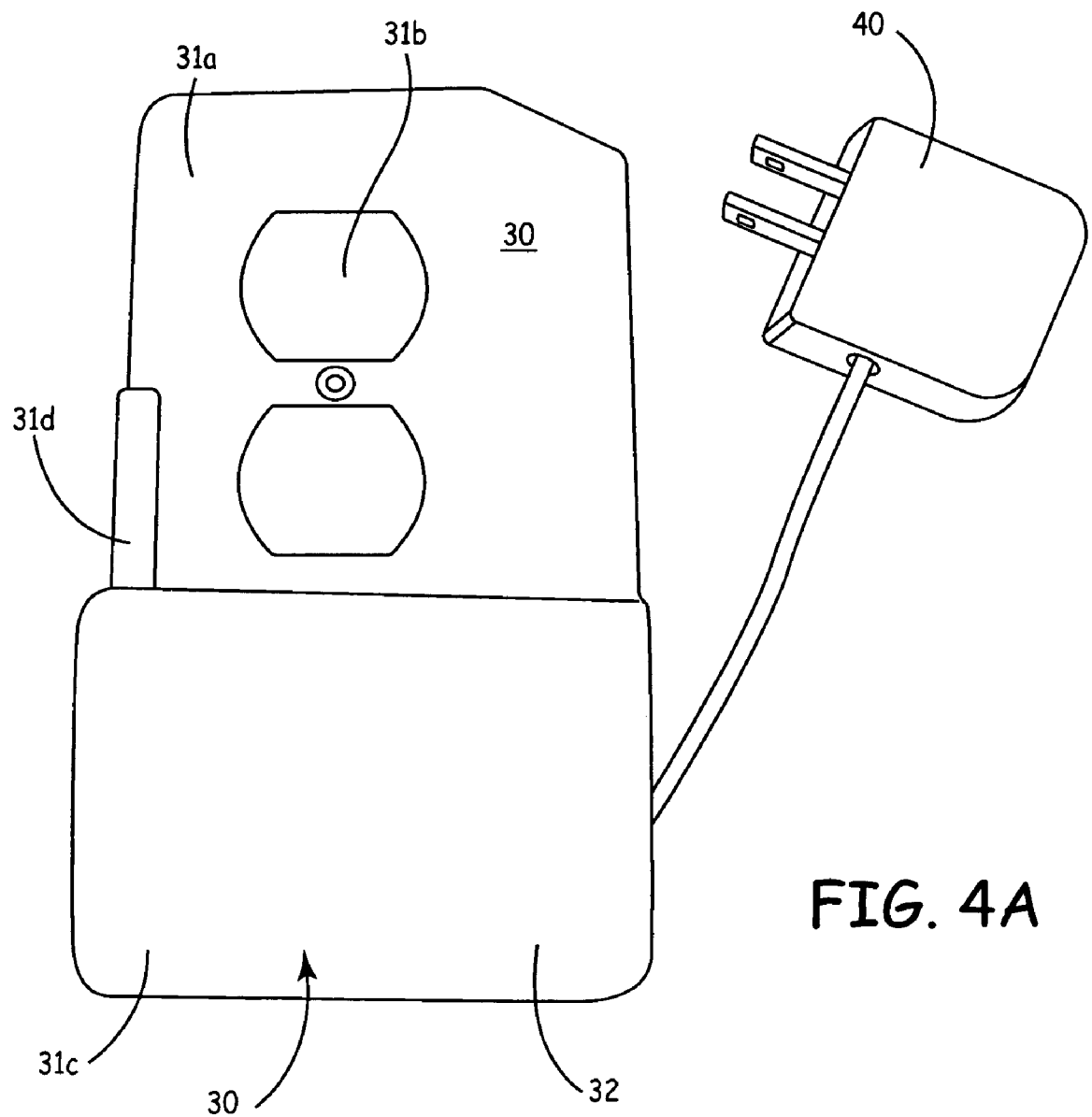
FIGS. 4A-4B are examples of a wall repeater adapted for use with the module of FIG. 1.
Figure 4B:
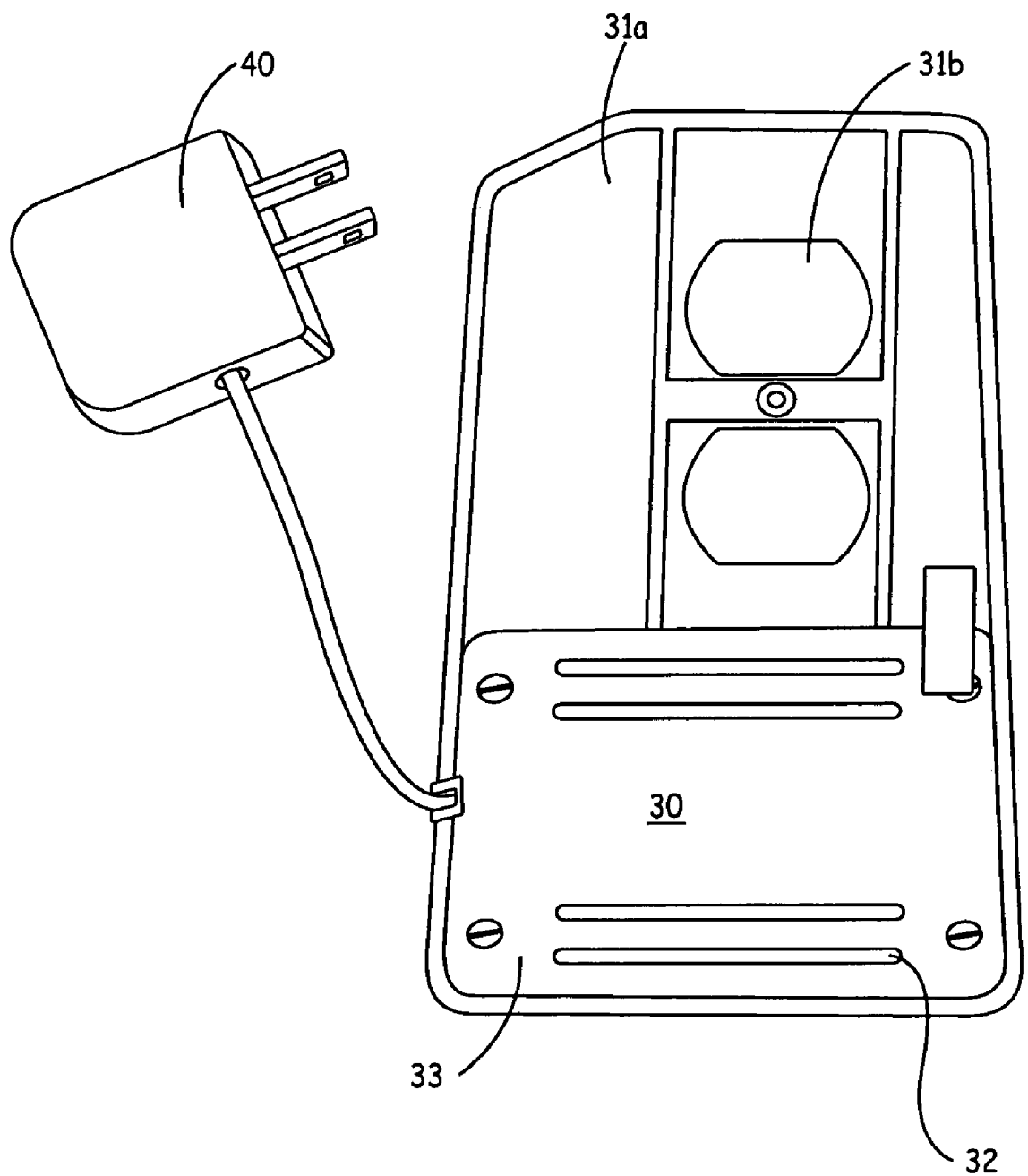

Referring to FIGS. 4A and 4B, there is illustrated an example of a wall repeater 30 adapted for use with consumption display module 10 of FIGS. 1-3. Wall repeater 30 provides for improved communication range, reliability and translation of multiband equipment and protocols. Wall repeater 30 can include at least one outlet cover portion 31a for detachably coupling to a wall outlet and a repeater housing portion 31c formed on or coupled to cover portion 31a for housing a repeater board 32 and antenna. Repeater 30 facilitates communication between an ERT disposed exterior a home or business, and coupled to a utility meter, and consumption display module 10. Cover portion 31a may include at least one aperture 31b extending therethrough for receiving an electric outlet. As illustrated in FIG. 4A, two apertures may extend through cover portion 31a to accommodate coupling of cover portion 31a to conventional wall outlets. Cover portion 31a may be detachably couplable to a wall outlet in a manner similar to conventional outlet covers.

Referring particularly to FIG. 4B, a repeater circuit board 32 of repeater 30 may comprise at least one printed digital circuit board capable of propagating and/or amplifying a signal from an ERT. However, in a related embodiment, multiple digital or analog circuit boards may be utilized. An antenna housing portion 31d may be formed on or coupled to repeater housing portion 31c for housing an antenna (not shown) coupled to repeater circuit board 32. In one embodiment, antenna housing portion 31d may extend along at least a portion of outlet cover portion 31a.

Powering wall repeater 30 may be accomplished by a plug 40 connected to repeater circuit board 32 or by replaceable or rechargeable batteries housed in repeater housing portion 31c. Wall repeater 30 can utilize a normal house 110-volt AC outlet as a mount and can serve as a support for various types of RF transceiving devices. The transceiving devices may include (but are not limited to) RF to RF, RF to PLC, and RF to infrared communication devices. The RF to RF conversion may include 900 MHz to 1.4 GHz, 900 MHZ to 900 MHZ at increased power, 900 to 2.4 GHZ, 900 to 5.6 GHZ or any combination of these RF bands as well as being bi-directional.

The unique mounting of wall repeater 30 described above provides convenient installation with little customer inconvenience. Additionally, the detachable feature of wall repeater 30 permits it to be easily moved, thereby enabling an end user to adjust a range of reception of utility consumption information by consumption display module 10. In this and other related embodiments, wall repeater 30 also includes other functional features such as a night-light, fire alarm, energy control motion sensing and burglar alarm motion sensing, by way of example.

Referring further to FIG. 4B, an access panel 33 may be removably coupled to a portion of repeater housing portion 31c for selectively providing access to repeater circuit boards 32 and the antenna. Access panel 33 also may also include at least one opening extending therethrough to provide ventilation and heat dissipation of repeater circuit boards 32. Access panel 33 provides convenient access for repairs and upgrade of repeater circuit boards 32 and/or antenna. The wall repeater, in one embodiment, an assist a sleeve repeater unit that is operably coupled to a metering device to enhance the signal either back to the display module or to one of the intermediate receivers.

Referring now to FIGS. 5-8, consumption display module 10 along with the method of collecting and displaying utility consumption data will be described in more detail. Referring more specifically to FIG. 5A, there is illustrated a block diagram 100 of the operation of consumption display module 110 with an ERT 130 coupled to a utility meter 132 according to the invention. In particular, consumption display module 110 is powered by a power supply 112, such as an AC wall power supply, that is coupled to regulators 113 which power all of the circuits of consumption display module 110. Consumption display module 110 further includes a microprocessor 114 having a radio module 115 (with antenna 124) and a keyboard (or keypad) 116 coupled thereto. A real time clock 117 is also coupled to microprocessor 114 as well as a display panel 118 and a flash memory module 119. In this embodiment, battery back-up 120 is also included in consumption display module 110 and a connection for a RS232 port 122 for remote PC applications is included. Block 140 represents the various applications that can interface with consumption display module 110 via port 122.

As illustrated in the example embodiment of FIG. 1, keyboard 116 includes a plurality of buttons or actuators (140, 142, 144, and 146) to permit an end user to interact with any applications or functions of consumption display module 110. The buttons may include a menu button 140 or switch for selecting and/or scrolling through various menu and sub-menu options, prompts or cues; an upward 142 and/or downward scroll button 144 to facilitate scrolling through the menu options, and a "Go" or "Enter" button 146 for selecting a particular function from the menu options. The table of FIG. 5B illustrates example functions of each of buttons 140-146 of keyboard 116 (see also FIG. 1). For instance, selecting or depressing menu button 140 may generate a scrollable list of menu prompts or cues on display 118. A user may then select up or downward scroll buttons 142, 144 to preview different menu options. Once a desired menu option is displayed, a user may select the desired menu option by depressing (ENTER) button 146.

Figure 5A:
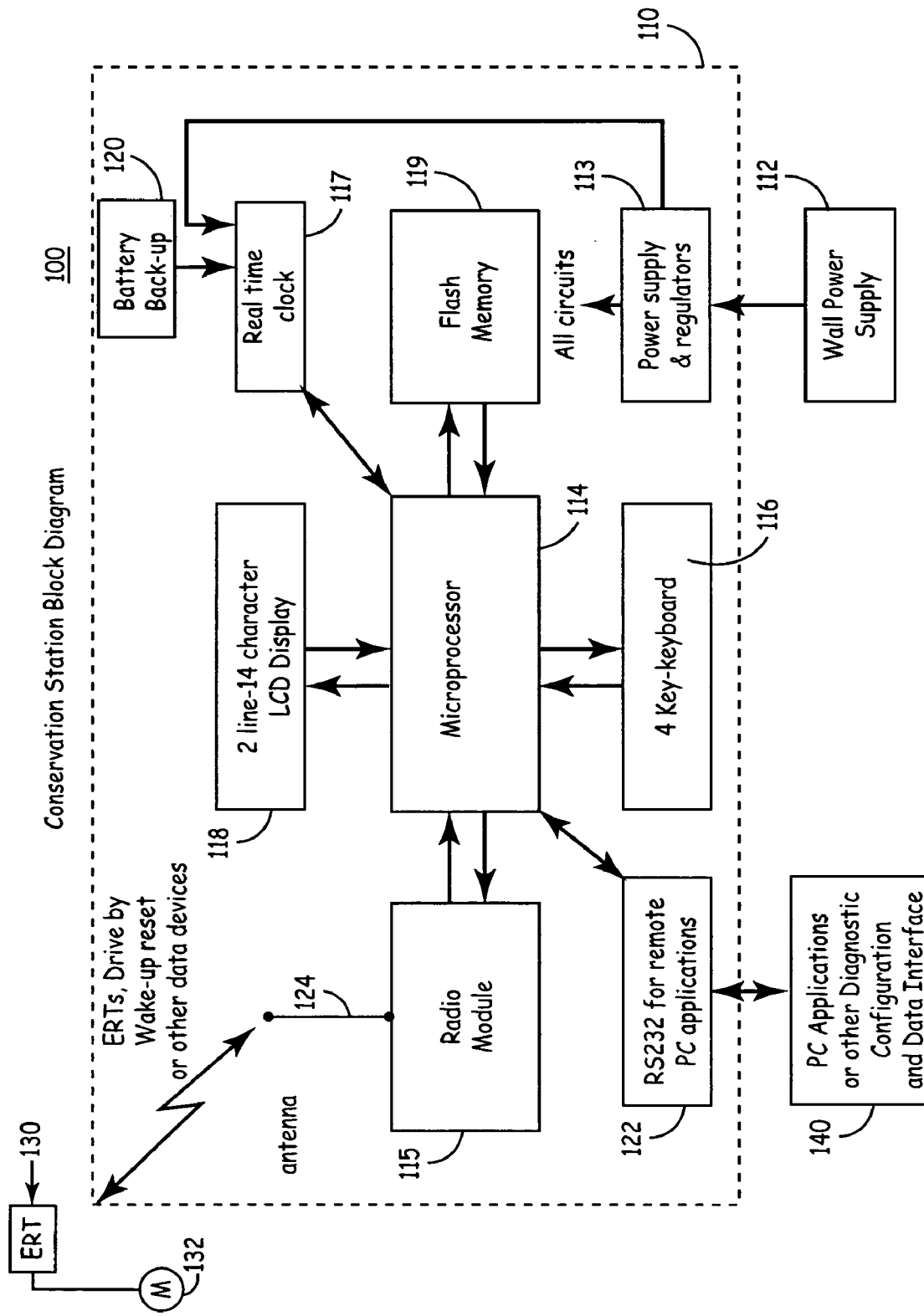
FIG. 5A is a block diagram of the operation of the energy home module with an ERT coupled to a utility meter according to the invention.
Figure 5C:
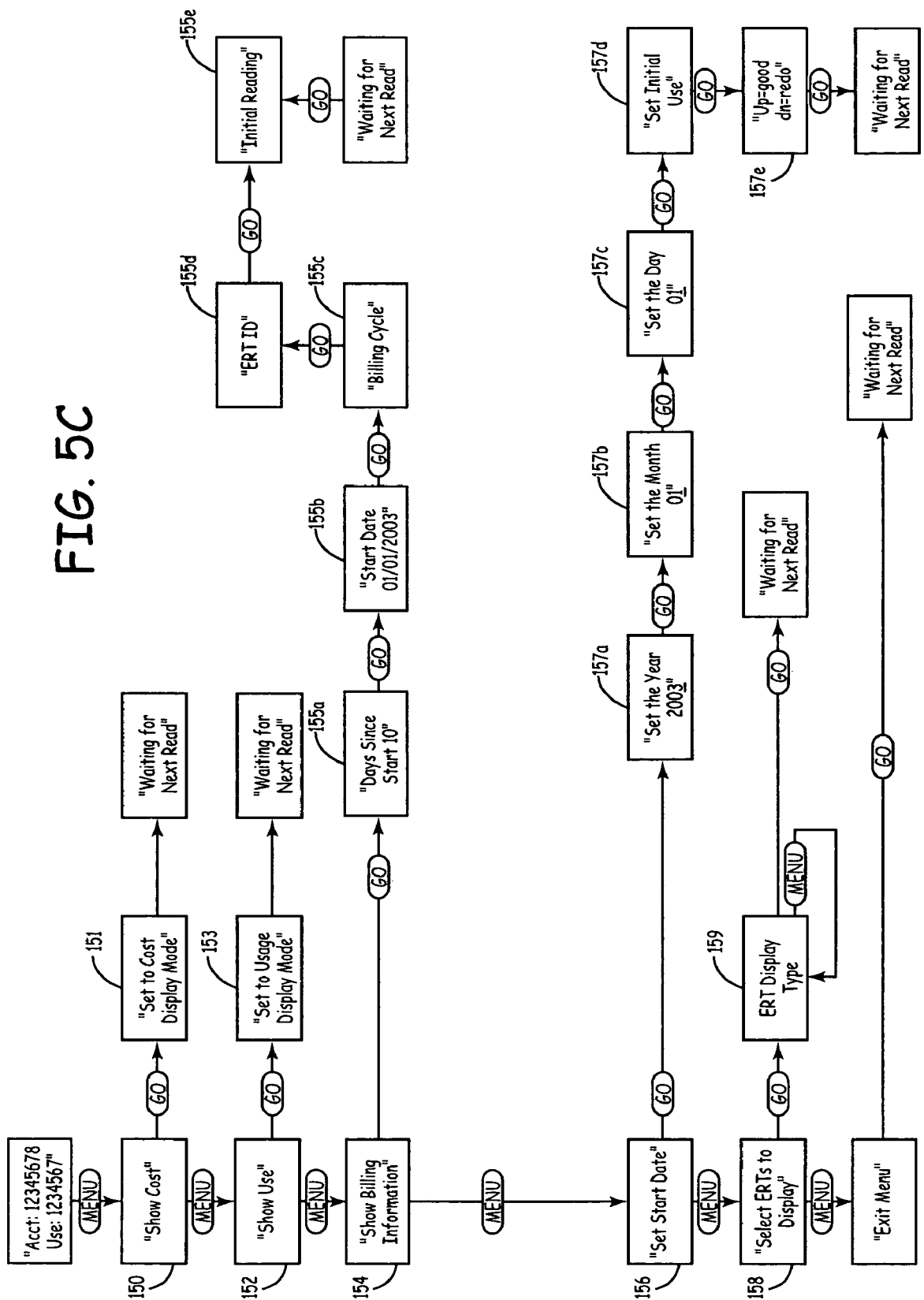
FIG. 5C is a flow chart illustrating various selectable menu options and sub-menu options programmed in the energy display module.
Figure 5D:
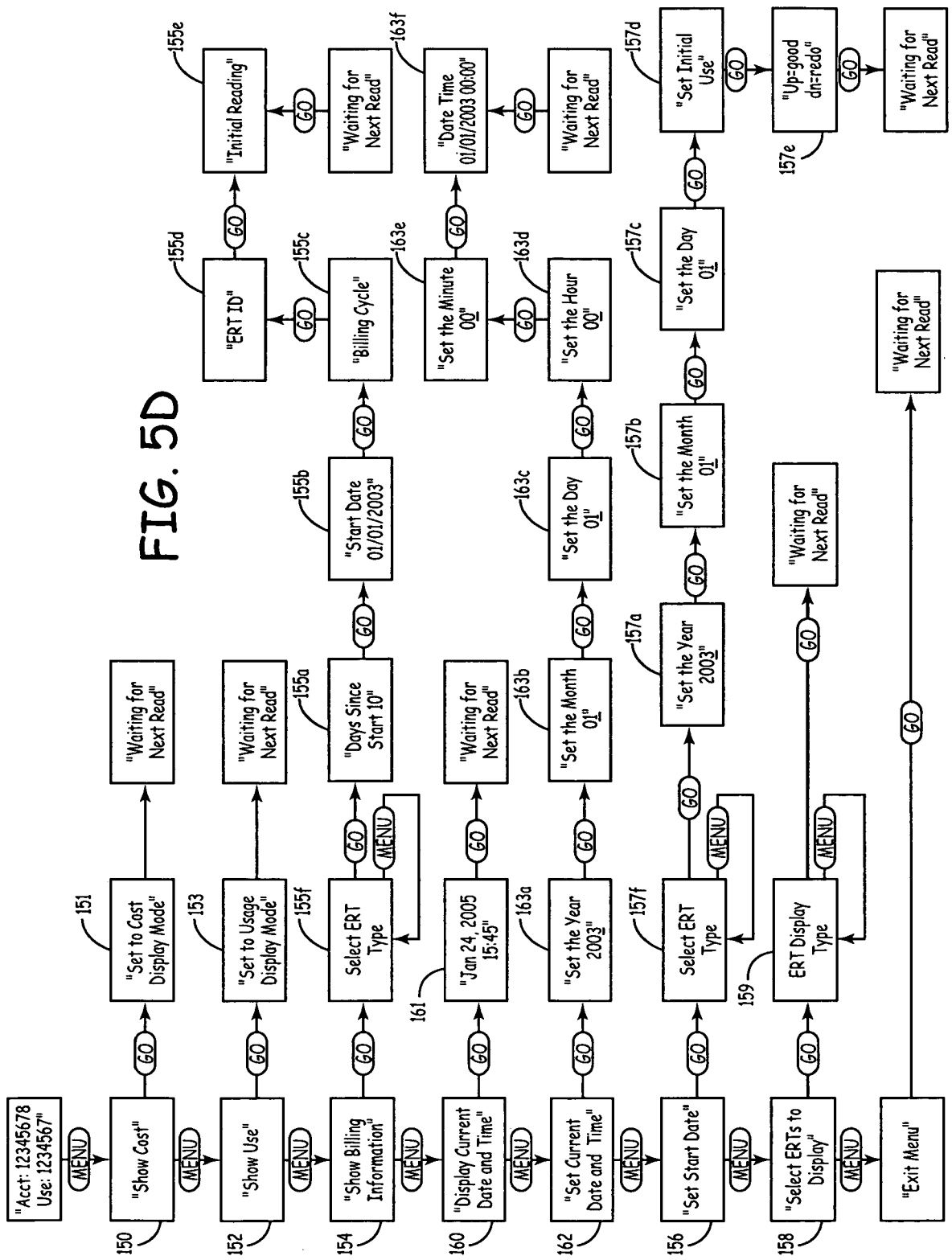
FIG. 5D is a flow chart of an alternate embodiment illustrating various selectable menu options and sub-menu options programmed in the energy display module.

In an example embodiment, depression of (ENTER) button 146 displays a sub-menu for the particular menu option selected. By navigating the menu options and sub-menu options a user is able to program consumption display module 110 to display various types of information. Examples of the type of information that may be displayed by consumption display module 110 is illustrated in FIGS. 5C-5D. Examples of displayable information may include (but is not limited to) utility cost 150, utility usage 152, billing information 154, set a date to starting monitoring utility consumption 156, current date and/or time 160, and/or setting the current date and/or time 162.

Displaying Utility Cost Information

In this example embodiment, the method for displaying utility cost information at 150 on consumption display module 110 includes depressing menu button 140 to display a menu option for "UTILITY COST" 150 or a similar message. Next, a user may select enter button 146 to set a cost display mode at 151. Various methods of cost display may be programmed into consumption display module 110, such as cost per hour, day, week and/or month. Additional cost display modes are also envisioned within the spirit and scope of the invention. After displaying a consumption cost, consumption display module 110 may wait a predetermined amount of time to receive the next incoming consumption information signal from an ERT and/or appliance, wherein it may display a cost of the utility consumed. In another embodiment, consumption display module 110 may be capable of automatically, continuously and/or periodically displaying utility costs.

Displaying Utility Usage Information

In a related embodiment, energy usage information may also be displayed on consumption display module 110 by depressing menu button 140 at least once and then depressing scroll button 144 to scroll through displayed menu options until "UTILITY USAGE" or similar message is displayed. In another embodiment, a user may repeatedly depress menu button 140 to scroll through and view various displayed menu options. Once the menu option for UTILITY USAGE 152 is displayed a user may then select enter button 146 to set a utility usage display mode 153. Utility usage display modes include utility usage per "kilowatt hour" for electricity, "cubic foot" for water, and "therms" for gas. Other utility usage display modes are also within the spirit and scope of the invention. Similar to the display of utility cost information at 150, consumption display module 110 may be preprogrammed to automatically display utility usage information at 152 after receiving a consumption information signal from an ERT and/or appliance.

Displaying Billing Information

In yet another embodiment, a user is able to obtain billing information from consumption display module 110 by depressing menu button 140 and/or scroll button 144 to display a menu option for "BILLING INFORMATION" at 154. A user may then depress ENTER button 146 to display a "NUMBER OF DAYS SINCE START" 155a sub-menu option. Enter button 146 may be depressed again to display a "START DATE" 155b of billing sub-menu option. A user may again depress enter button 146 to display a "BILLING CYCLE INFORMATION" 155c sub-menu option. Depression of enter button 146 again displays an "ERT ID" 155d sub-menu option of the ERT currently being monitored. A user may then depress enter button 146 to display an "INITIAL READING" at 155e of their utility bill up to that particular point. Consumption display module 110 may redisplay or refresh the billing information after each signal received from an ERT and/or appliance. In another embodiment of the invention, as illustrated in FIG. 5D, consumption display module 110 may be capable of monitoring several ERT and/or appliances in a home or business. In this embodiment, a user may be presented with a sub-menu option of "SELECTING AN ERT TYPE" 155f (see FIG. 5D) or appliance before viewing other billing information 155a-e.

Setting Start Date of Monitoring

A start date of monitoring one or more ERTs and/or appliances may be programmed into consumption display module 110. The following method may be used to review and set a monitoring start date. A user may depress menu button 140 and/or scroll button 144 to obtain a menu option for "SETTING A START DATE" at 156. A user may access sub-menu options "SET THE YEAR" at 157a, "SET THE MONTH" at 157b, "SET THE DAY" at 157c and/or "INITIAL USE" at 157d by using scroll buttons 142 and 144 to increase and/or decrease values, menu button 140 to select next field or digit and enter button 146 to move between sub-menu options SET THE YEAR at 157a, SET THE MONTH at 157b, SET THE DAY at 157c and/or INITIAL USE at 157d. Next, a user may be presented with a sub-menu option ACCEPTANCE/REDO at 157e. The user may select scroll button 142 to accept the start date previously entered or scroll button 144 to redo or reset the set date. If a user selects to reset the start date, the menu options SET THE YEAR at 157a, SET THE MONTH at 157b, SET THE DAY at 157c and/or INITIAL USE at 157d are automatically re-displayed for user input. In another embodiment, as illustrated in FIG. 5D, a user may be presented with a menu option to "SELECT AN ERT TYPE" at 157f prior to sub-menu options at 157a-157d. This sub-menu option permits a user to select a particular start date for each ERT and/or appliance being monitored.

Select ERT to Display

In an embodiment of the invention where multiple ERTs and/or appliances are being monitored, energy module 110 may include a menu option "SELECT ERTs AND/OR APPLIANCES TO DISPLAY" at 158. This menu option permits a user to set consumption display module 110 to receive a signal from a particular ERT and/or appliance. In another embodiment, energy module 110 may be capable of simultaneously receiving multiple consumption signals from different ERTs and/or appliances. To select a particular ERT and/or appliance a user can depress menu button 140 until SELECT ERTs TO DISPLAY at 158 menu option is displayed. Depressing enter button 146 again presents a user with sub-menu option "SELECT ERT TYPE" at 159. A user may scroll through or view various ERT and/or appliances by repeatedly depressing menu button 140. A desired ERT and/or appliance may be selected by depressing enter button 146. This method of selecting a particular ERT and/or appliance to display on consumption display module 110 may be used in other sub-menu options that utilize selecting an ERT and/or appliance to display.

Displaying Current Date and Time

In another embodiment, consumption display module 110 also displays a current date and time. A menu option "DISPLAY CURRENT DATE AND TIME" at 160 is accessible by depressing menu button 140 and/or enter button 146 to cycle through menu options. When a user depresses enter button 146 the current date and time at 161 is displayed on display 118. Display of the current date and time is not limited to any particular format and may vary depending upon the user and/or region of use.

Setting Current Date and Time

In this example embodiment, consumption display module 110 includes a menu option "SETTING CURRENT DATE AND TIME" at 162 to enable an end user to set a correct date and time for their particular region or location. This menu option is accessible by depressing menu button 140 and/or scroll button 144 to cycle through the menu options. Depressing enter button 146 causes consumption display module 110 to display sub-menu options "SET THE YEAR" at 163a, "SET THE MONTH" at 163b, "SET THE DAY" at 163*c*, "SET THE HOUR" at 163*d*, and "SET THE MINUTE" at 163*e*. The year, month, day, hour and minutes may be modified by depressing menu button 140, scroll buttons 142 and 144 and/or enter button 146. An end user may move between sub-menu options 163*a*-163*e* by depressing menu button 140 and/or enter button 146. Once the date and time have been entered an end user may depress enter button 146, wherein the current date and time are displayed on consumption display module 110.

Consumption display module 110 is also configurable to listen for one unique Water ERT, one unique Gas ERT, and one unique Electric ERT. Consumption display module 110 can be configured to effectively filter out all other ERT transmissions that it receives. This allows consumption display module 110 to focus its data gathering effort on all of the energy utilized for a specific building or home and to display these three consumptions on the LCD or display 118 by scrolling the information for the user. In contrast to this feature, consumption display module 110 can also report all of the ERT transmissions that it receives through its serial port allowing consumption display module 110 to become a data collection center for nearby ERTs. This is important with regards to ERT discrimination for focusing on a specific energy source. A user can access energy consumption information of each appliance by the method described above. Additionally, a repeater may also be used to propagate an energy consumption signal of appliances a distance away from consumption display module 110.

As mentioned above consumption display module 110 is capable of monitoring and/or sub-metering one or more appliances within a house or business. Consumption display module 110 may be capable of monitoring utility consumption by electric heat sources such as furnaces, baseboard heaters and like devices. Other electrical energy consuming devices that can be monitored include electric hot water heaters, electric dryers, electric pool pumps, sump pumps, air conditioners or central air devices, and/or whole house or building fan systems. In another embodiment, consumption display module 110 can monitor indoor and outdoor water consumption. In another embodiment, energy module 110 can monitor gas consumption of ranges, stoves and/or ovens, clothes dryers, gas water heaters and/or furnaces. In a business setting, consumption display module 110 can monitor electric, gas and/or water consumption of particular machines or departments within the facility.

Figure 5E:
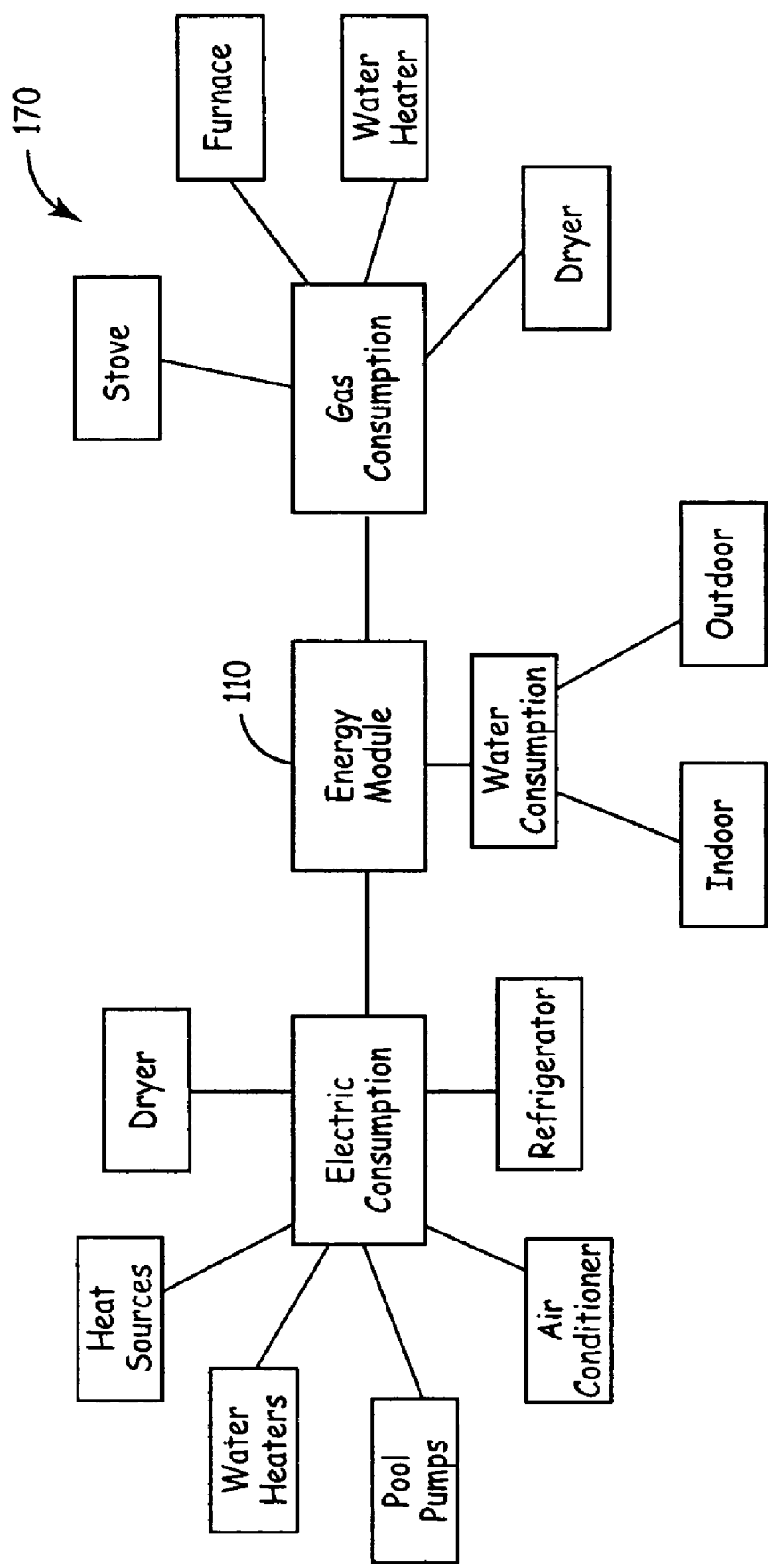
FIG. 5E is a block diagram of a utility consumption monitoring network according to the invention.

Referring now to FIG. 5E, a utility consumption-monitoring network ("ECNM") 170 can be utilized to monitor utility consumption by one or more appliances. ECNM 170 can use an ERT or similar device placed in communication with each appliance being monitored. Each ERT would then transmit utility consumption information to consumption display module 110 for display to the end user. In another embodiment, major appliance manufacturers are currently considering the implementation of Bluetooth and Wi-Fi connectivity to the Internet. The functionality of these types of functions and devices lends itself to utilization with ECNM 170 without substantial system reconfiguration. REMS and consumption display module 110 can easily provide this capability by utilizing a translator function (Bluetooth to 900 MHz, Wi-Fi to 900 MHz or alternatively 1.4 GHz).

In another embodiment, consumption display module 110 can measure and monitor internal and/or external environmental parameters such as house or building temperature, attic temperature, outside temperature, wind direction and/or speed, humidity, and other like parameters. Consumption display module 110 can then correlate the environmental parameters and utility consumption measurements of each or all of the utilities monitored. Consumption display module 110 can also correlate environmental parameters with the energy consumption of a particular appliance. By correlating the environmental parameters and utility consumption an end user may be able to predict or forecast utility consumption or utilization and adjust their usage accordingly.

Figure 5F:
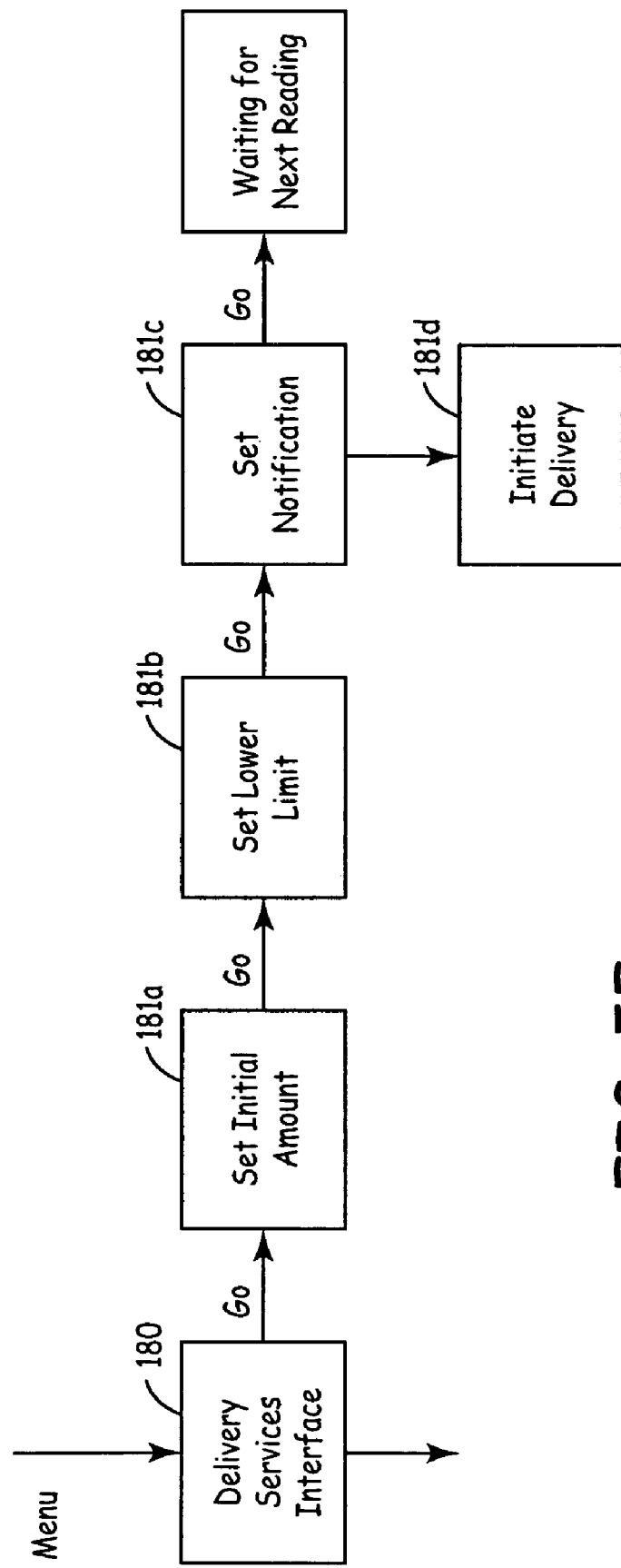
FIG. 5F is a flow chart illustrating a delivery services interface menu option and sub-menu options programmed into the energy display module.

The ability to monitor and forecast utility utilization may be of particular importance for periodically deliverable utilities such as propane and oil. Referring now to FIG. 5F, consumption display module 110 may include a menu option for "DELIVERY SERVICES INTERFACE" 180 that is accessible by the methods described above. Upon the delivery of a utility such as propane or oil, an end user may access DELIVERY SERVICES INTERFACE at 180 and select enter button 146 to access sub-menu option "INITIAL ENERGY AMOUNT" at 181*a* to set an amount of utility delivered. At the same time, an end user access sub-menu "LOWER LIMIT" 181*b* and "NOTIFICATION" 181*c*, to set a lower limit or level of utility such that consumption display module 110 can notify an end user when the utility utilized reaches the set lower limit. In another embodiment, consumption display module 110 can initiate delivery 181*d* of additional utility upon detection of the set lower limit. Consumption display module 110 can utilize Bluetooth and/or Wi-Fi technology to connect to the Internet and place the order.

Consumption display module 110 can also include an alarm, warning or notification mechanism for notifying an end user of a particular event or events. In one embodiment, consumption display module 110 can notify an end user of excessive utility consumption, which can be an indicator of water leakage, gas leakage and/or electricity theft. Consumption display module 110 can determine excess utility consumption by determining a utility utilization upper limit during off peak times and notifying an end user if the upper limit is exceeded. Consumption display module 110 can also notify an end user if a pricing tier or block level is exceeded, thereby permitting an end user to reduce usage of a particular utility and/or switch to an alternative utility. Consumption display module 110 can also notify an end user if the total utility cost approaches or exceeds a preset limit. Preset limits can be manually programmed into consumption display module 110 by the methods described previously.

Consumption display module 110 includes at least one software program adapted to present data gathered from ERT and similar devices. The at least one software program is configurable to display actual utilization, prediction of energy consumption, year to date and comparison with last year, dollars spent, identify greatest consumption and expense associated with specific devices, "what if" predictor of utilization, correlation with utility billing information, acceptance of actual billing data from utility, correlation with weather data, acceptance of weather information and graphical presentation of utilization and/or data gathered. The software program can be preloaded or preprogrammed at the time of manufacture or can be updated remotely via transmissions from the utility company.

Referring now to FIGS. 6A-8, FIGS. 6A-6B illustrate schematic diagrams of the logic boards within module 10. FIG. 6C is a schematic diagram of the real time clock with battery power back up and separate crystal. In particular, these figures illustrate the Texas Instrument Microprocessor MSP430F149 (U28), with JTAG programming connection (J11), connections to the Liquid Crystal Display (J5 and J3) and connections to the radio transceiver board described in FIGS. 7A and 7B (J15). There is also illustrate power supply regulators (U30 and U27) that are connected to the real time clock shown in FIG. 6C (Port 2.x of U28), an RS232 level shifter (U26), and an 8.26 Mhz crystal oscillator for decoder timing (U22 and Y3). In this example embodiment, the microprocessor contains the application software in its internal FLASH memory. This device controls the operation of the Home Display. Packet data is managed and verified by the microprocessor. The transceiver (FIGS. 7A and 7B) is controlled through a serial SPI bus by the microprocessor.

Figure 6A:
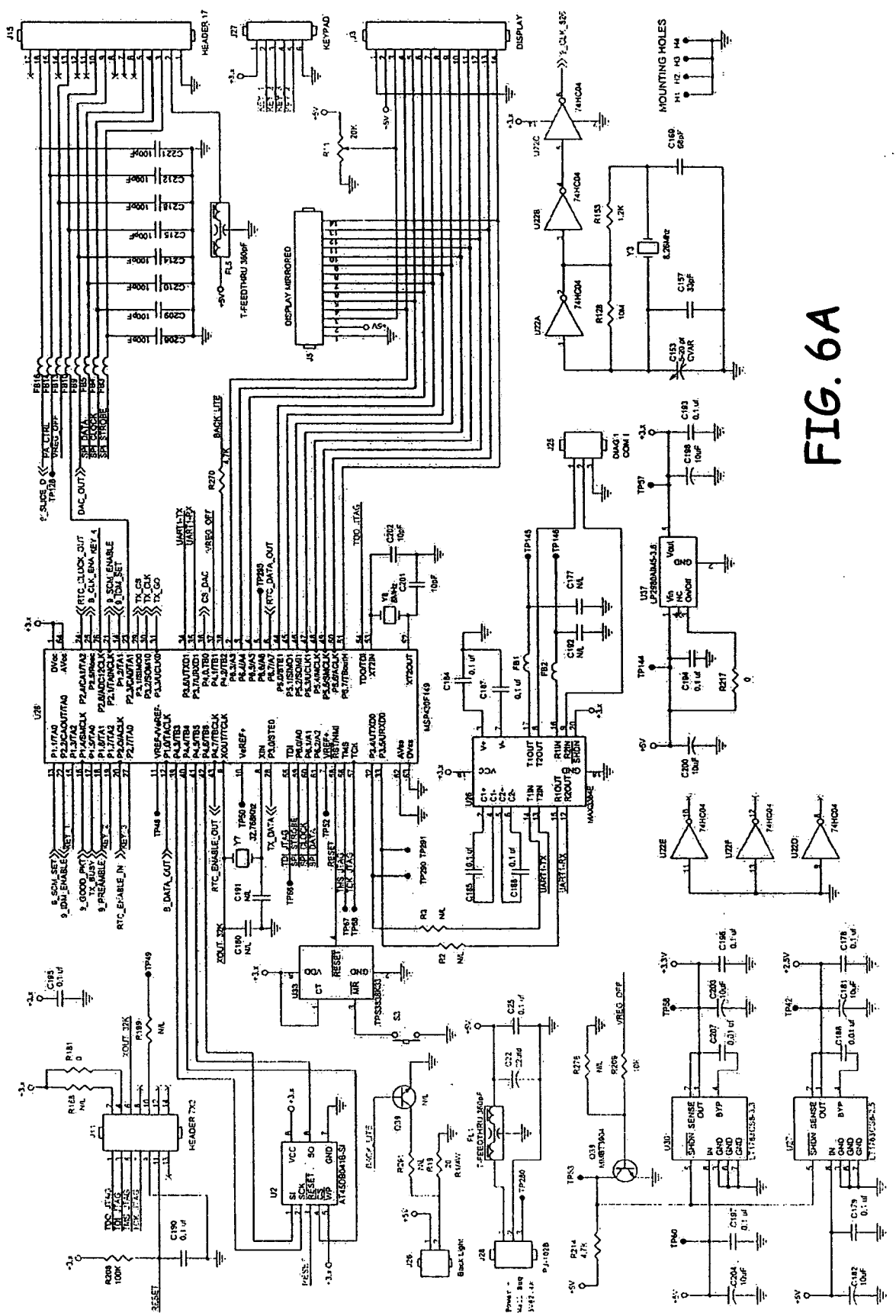
FIGS. 6A-6B are schematic diagrams of a display module logic (PCB) board used in connection with the energy display module of FIG. 1.
Figure 6B:
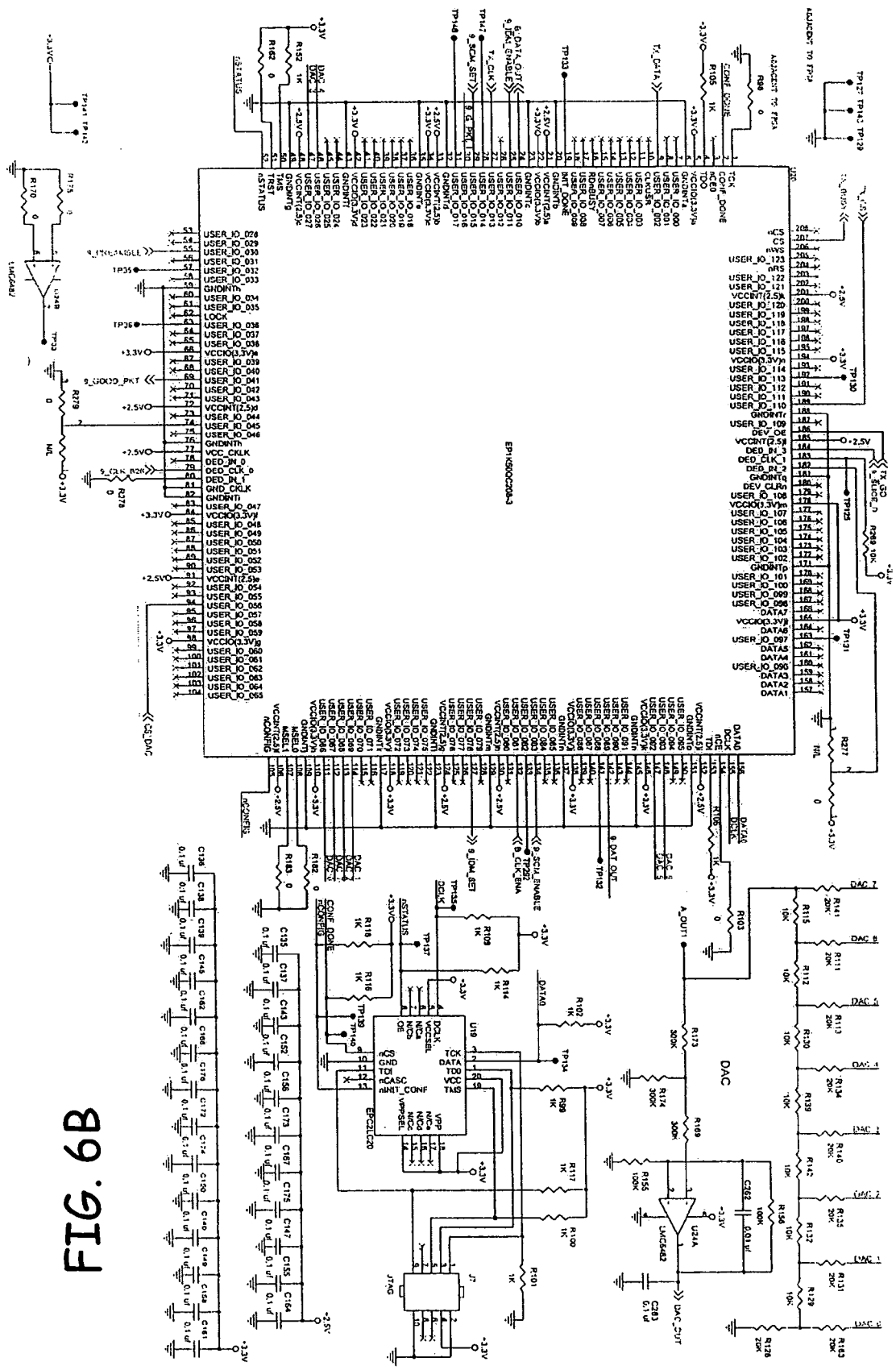
Figure 9C:
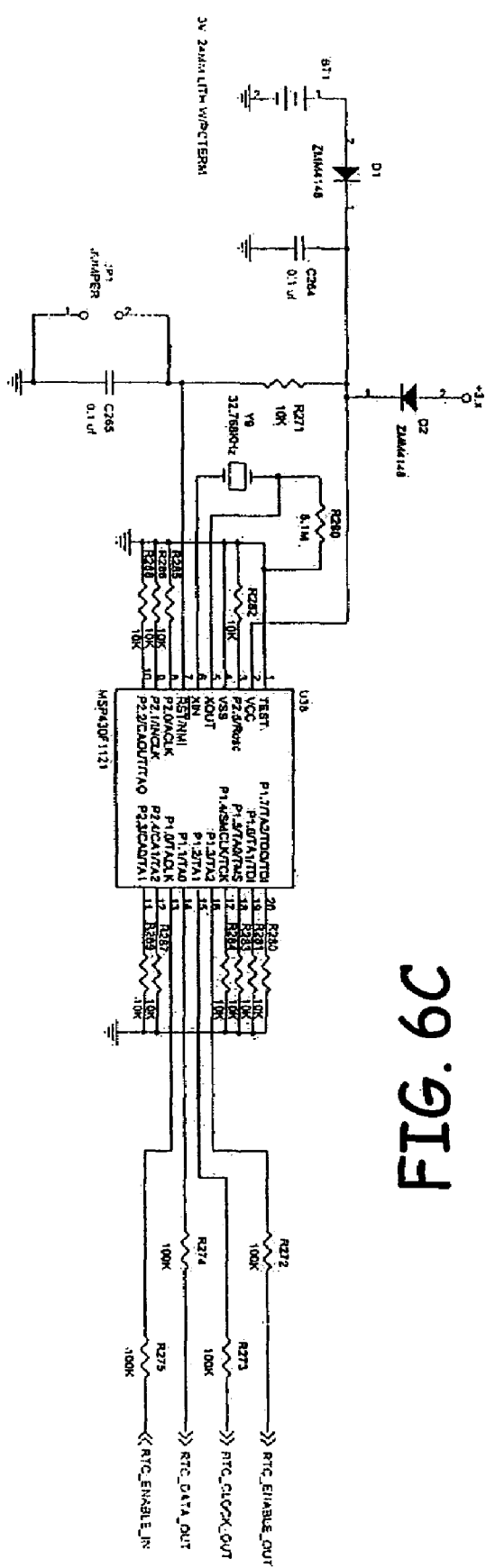

FIG. 6B illustrates a Field Programmable Logic Array (FPGA, EP1K50QC208-3, U20) with a serial flash configuration memory (EPC2LC20, U19) and a JTAG connection (J7). The FPGA is placed in the path between the microprocessor and the radio transceiver board (see FIGS. 7A and 7B), and decodes the Manchester encoded data stream from the radio board for use by the microprocessor. During receive data is buffered within the FPGA for subsequent retrieval by the microprocessor. During transmit the FPGA receives serial data from the microprocessor, converts it to Manchester encoded data and controls the OOK (ON OFF KEYED) modulation of the transmitter. Transmit power control is also performed by the FPGA. The microprocessor communicates with the FPGA over a serial SPI bus for data transfers, and power settings.

FIG. 6C illustrates an MSP430F1121 microprocessor (U38) and its 32 KHz crystal (Y9), backup battery (BT1), and connections to the main microprocessor (FIG. 6A). This support microprocessor (U38) maintains in its memory date and time information and performs as a continuous source of real time clock and calendar information for the main microprocessor (FIG. 6A).

Figure 7A:
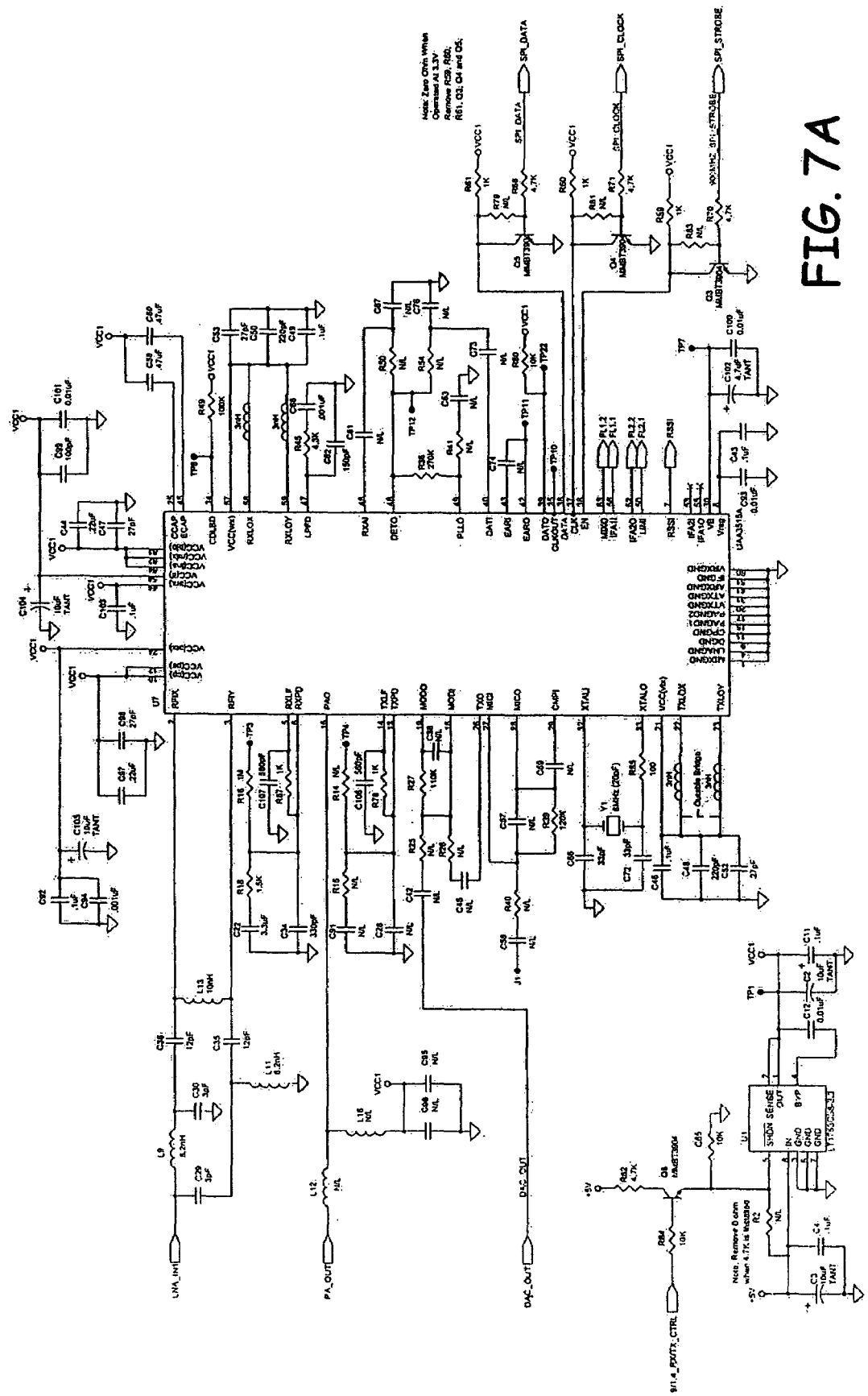
FIGS. 7A-7B are schematic diagrams of the radio module illustrated in FIG. 5 used within the display module.
Figure 7B:
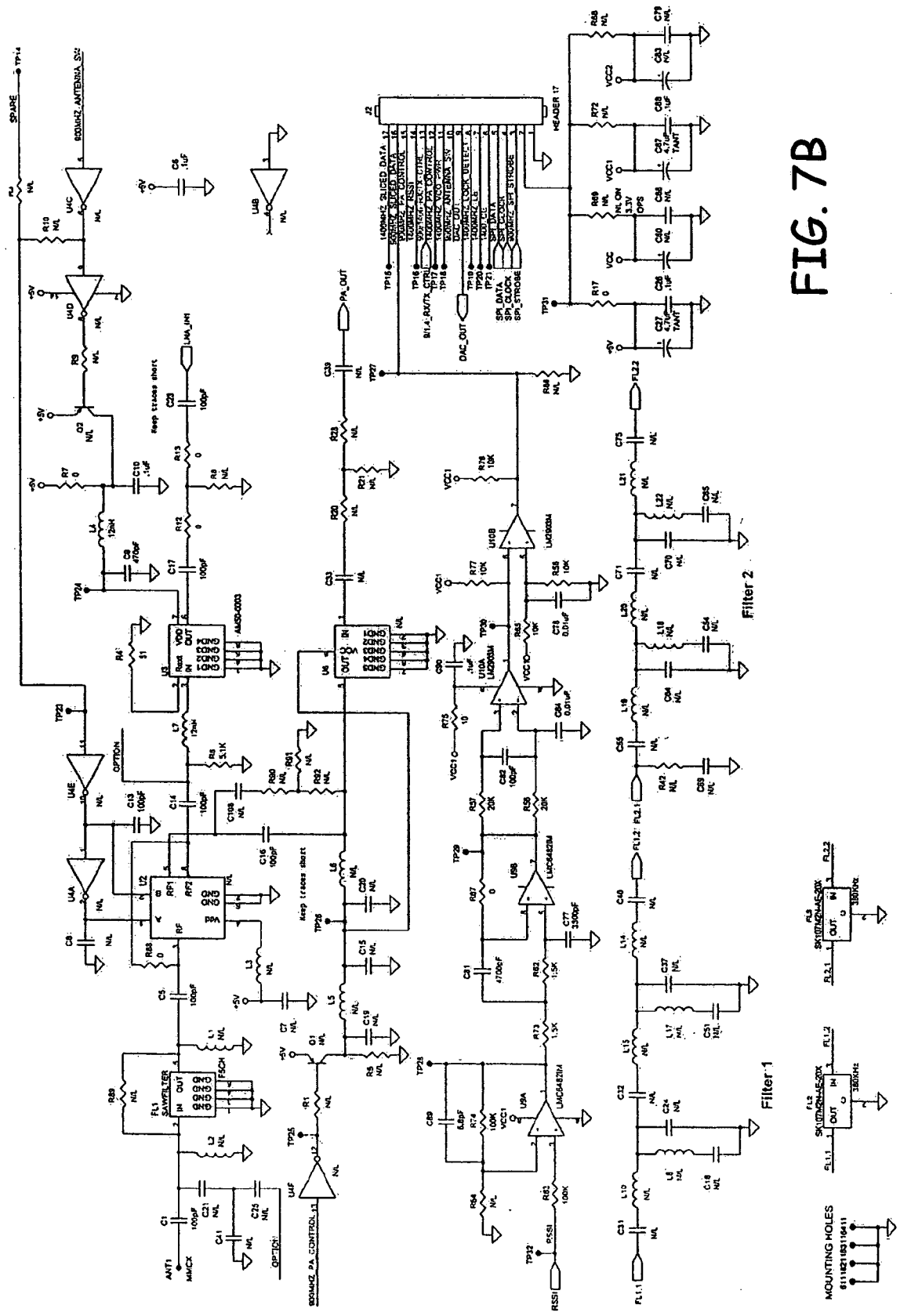

FIGS. 7A-7B are schematic diagrams of the radio module illustrated in FIG. 5 used within module 10 of the present invention. FIG. 7A illustrates includes the Philips UAA3515A RF ASIC (U7) which is a transceiver application specific integrated circuit (ASIC) and voltage regulator (U1). This part contains the majority of the radio transmit and receive circuitry. The UAA3515A communicates with the microprocessor over a serial SPI bus (Pins 3,4, and 5 of J2 FIG. 7B). The UAA3515A responds to set up and frequency control information from the microprocessor.

FIG. 7B illustrates the circuitry between the antenna and the RF ASIC along with providing connections to the main printed circuit board via connector (J2). FIG. 7B also provides RSSI signal buffering (U9), a data slicer (U10) and Intermediate Frequency (IF) filtering of the received signal (Filter 1 and Filter 2). The received data from the data slicer leaves the transceiver board on J2 and is connected to the FPGA which resides in FIG. 6B. The power amplifier (U6), antenna switch (U2), SAW (FL1), and low noise amplifier (LNA, U3) are also included on this figure. The antenna switch selects either receive or transmit mode. When operating in transmit mode the power amplifier boosts the transmit signal destined for the antenna. When operating in receive mode, the SAW and discrete filtering components reject unwanted signals before arriving at the LNA. The LNA increases the signal level for use by the UAA3515 RF ASIC. The SAW and discrete filtering components reject out of band, undesired signals before arriving at the UAA3515A. The intermediate frequency filters are connected directly to the RF ASIC in FIG. 7A and provide receiver filtering that occurs within the RF ASIC.

Figure 8:
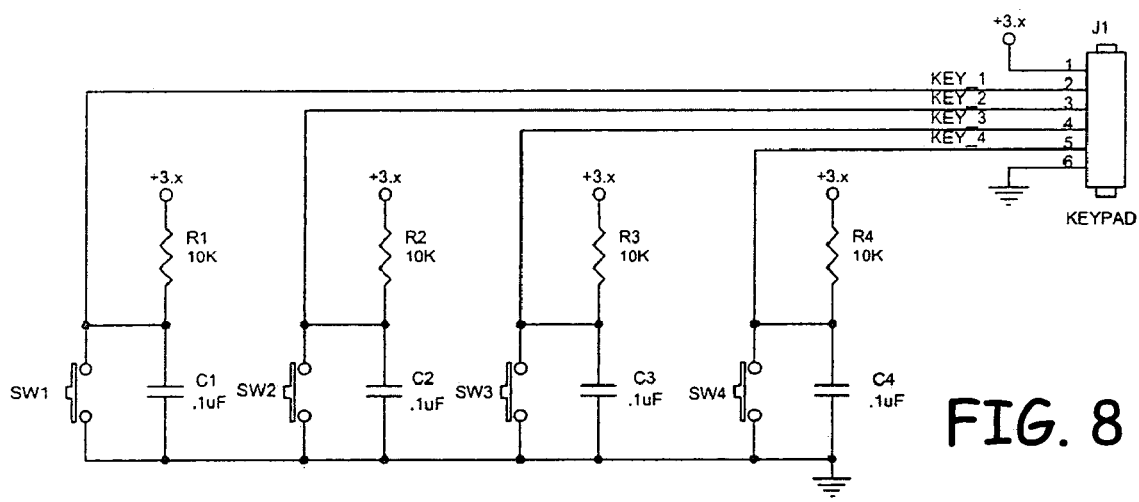
FIG. 8 is a schematic diagram of the keyboard of the module of FIG. 1.

FIG. 8 is a schematic diagram of the keyboard of module 10 of FIG. 1. In particular, the 4 push buttons available to the operator on the front of the unit of this embodiment allow the operator to change modes, adjust parameters, reset registers, and request additional information that is kept in the memory of the microprocessor. The push buttons along with the LCD display provide the user interface for the display module.

In a related embodiment, the display module is configurable to receive data directly from the ERT where the ERT has high power levels, such as a 1.4 GHz version for the water pit ERT version. Also periodic transmissions from the water pit ERT can be coordinated with the display module collection mode to increase reliability in gathering data. This would provide flexibility and lower cost in locating the display module since the wall repeater would not be necessary. In other embodiments of the display module, the wall repeater would be interposed with the display module and the water pit ERT to ensure data collection in instances were the water pit ERT is located a fair distance from the display module and the ERT signal is weaker.

In another related embodiment, the consumption display module is simplified in its design to include a single frequency radio receiver, an inexpensive microprocessor, a small capacity memory for minor data storage and an inexpensive display, all intended to operate on battery power, so as to generate an inexpensive module. The module may also include a minor feature of collecting and displaying small amounts of information as directed by the consumer, similar to a trip odometer in automotive applications. In this and other embodiments, the display module can be fitted with a magnet or a hook and fastener type system to facilitate location on a kitchen appliance for ease of use and viewing. In this and other embodiments, the display module can be fitted with a battery to also facilitate location on a kitchen appliance or other location in the home for ease of use and viewing.

In the various embodiments described above, the microprocessor of the display module can be configured to include a leak detection algorithm or scheme, such as described in U.S. Patent Application, entitled "Passive Consumptive Leak Detection", having U.S. patent application Ser. No. 10/965,283, filed on Oct. 14, 2004, which hereby incorporated by reference in its entirety. With the leak detection capability, the display module is able to take data provided by the water meter ERT and determine if there is a leak by continuous and low quantity of water usage, such as when a toilet is leaking or a faucet is leaking somewhere on the premises. Also the time of day usage is also a clue that there may be a leak, especially where the water meter ERT is generating data in the middle of the night or when everyone is on vacation.

In yet another related embodiment, the electronics of consumption display module 110 can be applied to automotive diagnostics and consumables. As an example, the display could communicate with the personnel vehicle to relay information on the status of the car. Things that could be communicated might be fuel level, maintenance related functions such as oil change, intermittent sensors, warranty recalls and general health of the vehicle. We also mentioned a data repository of the homeowner that he or she can take with them. In general all information that is available from the on board computer can be communicated to the consumption display module 110. Further, in a fixed network application, this information can be forwarded through the system to a head end or in the case of REMS, directly into the Internet for direct connection to the appropriate service department.

The present invention may be embodied in other specific forms without departing from the spirit of the essential attributes thereof; therefore, the illustrated embodiments should be considered in all respects as illustrative and not restrictive, reference being made to the appended claims rather than to the foregoing description to indicate the scope of the invention.

We claim:

1. In an automatic meter reading (AMR) system that includes a plurality of endpoint devices interfaced with utility metering devices, wherein the endpoint devices each generate and wirelessly transmit utility consumption-related data to a corresponding at least one reading device to be ultimately provided to a host processor operated by a utility service, the AMR system further including an apparatus for collecting and displaying consumption data for use by a user associated with a customer of the utility service, the apparatus comprising:

communication circuitry configured to receive at least a portion of the utility consumption-related data that is wirelessly transmitted by the plurality of endpoint devices for reception by the corresponding at least one reading device;

a display adapted to display, to the user information based on at least a portion of the utility consumption-related data that is received by the communication circuitry;

control circuitry operably coupled to the communication circuitry and to the display, wherein the control circuitry is configured to control the receipt and display of the utility consumption-related data to the user such that only the utility consumption-related data generated by endpoint devices corresponding to the customer of the utility service is displayed;

power circuitry operably coupled to the control circuitry to regulate a flow of power thereto; and a housing adapted to house the control circuitry, communication circuitry, power circuitry and display.

2. The apparatus of claim 1, further comprising an actuating member disposed on the housing and operably coupled to the control circuitry to facilitate operating the apparatus.

3. The apparatus of claim 1, wherein the control circuitry comprises at least one programmable logic device selected from the group, consisting of: a FPLG, a PLC, and a microprocessor.

4. The apparatus of claim 1, wherein the communication circuitry comprises a radio module adapted to at least receive the utility consumption-related data wirelessly transmitted from the corresponding at least one endpoint device.

5. The apparatus of claim 4, wherein the radio module includes a receiver, a transmitter, and an antenna.

6. The apparatus of claim 1, further comprising storage operably coupled to the control circuitry to facilitate the storage of the received utility consumption related data.

7. The apparatus of claim 1, further comprising a real-time clock operably coupled to the control circuitry to facilitate accurate display of utility consumption-related data.

8. The apparatus of claim 1, wherein the communication circuitry is adapted to interface with a computing device selected from group consisting essentially of a handheld computing device, a residential energy management system, a mobile data collection system, and a fixed network.

9. The apparatus of claim 1, further including a repeater adapted to propagate the transmitted utility consumption-related data from the at least one of the at least one corresponding endpoint device to the communication circuitry.

10. The apparatus of claim 9, wherein the repeater comprises a generally portable wall repeater removably couplable to a wall outlet, wherein the wall repeater includes repeater circuitry configured to receive, amplify and transmit the utility consumption-related data from the at least one of the at least one corresponding endpoint device to the communication circuitry.

11. The apparatus of claim 10, wherein the wall repeater additionally includes a housing having:

a circuitry housing portion to house the repeater circuitry; and an outlet cover portion that is removably couplable to the wall outlet.

12. The apparatus of claim 11, wherein the circuitry housing portion includes an antenna housing portion to house an antenna of the repeater circuitry.

13. The apparatus of claim 1, further including a RS232 port operably coupled to the control circuitry to facilitate communication between the apparatus and a remote computing device.

14. The apparatus of claim 1, wherein the display comprises at least one display element selected from the group consisting of: a liquid crystal display element, a plasma display element, and a light emitting device (LED) display element.

15. In an automatic meter reading (AMR) system that includes a plurality of endpoint devices interfaced with utility metering devices, wherein the endpoint devices each generate and wirelessly transmit utility consumption-related data to at least one reading device to be ultimately provided to a host processor, method for automatically collecting and displaying utility-service information based on the utility consumption-related data to a user associated with a customer of a utility service monitored by a set of at least one endpoint device associated with the customer, the method comprising:

wirelessly transmitting, by a first endpoint device of the set of at least one endpoint device, a first transmission of utility consumption-related data for reception by at least one of the at least one reading device;

receiving the first transmission by a remote display device that is situated remotely from the first endpoint device;

processing, by the remote display device, the first transmission to produce the utility service information; and displaying to the user, by the remote display device, only the utility-service information that is based on the utility consumption-related data generated by the set of at least one endpoint device associated with the customer.

16. The method of claim 15, wherein displaying the utility service information to the user includes displaying only the utility service information relevant to the customer of the utility service.

17. The method of claim 15, further including receiving, by the remote display device, utility consumption-related data via corresponding transmissions from a plurality of specific endpoint devices that are associated with the customer of the utility service.

18. The method of claim 15, wherein displaying the utility service information includes displaying at least one item of utility service information selected from the group consisting essentially of: cost of utility, billing information, billing projection information, current date and time, setting current date and time, setting a start date of monitoring, selecting an endpoint device, and selecting an appliance to monitor.

19. The method of claim 15, further including notifying the user, by the display device, of an event selected from the group consisting essentially of a predetermined amount of utility consumed, an amount of excess utility consumed, a date, a time, and ordering of utility.

20. The method of claim 15, further including facilitating programming control circuitry of the display device by providing navigable displayable menu options and sub-menu options.

21. A system for displaying consumption data for use by a user associated with a customer of at least one utility, the system comprising:
   means for metering a utility, said means being operably coupled to a utility meter that is based in a premises of said customer and including means for transmitting utility consumption data to an automatic meter reading system reader; and
   means for receiving said utility consumption data transmitted by said means for metering said utility and for displaying, to said user, only utility consumption-related information unique to said customer based on said utility consumption data, said means for receiving said utility consumption data being-based in said premises.

22. A system for displaying utility consumption-based data for use by a user associated with a customer of at least one utility, the system comprising:
   a plurality of utility metering devices, each of the utility metering devices being operably coupled to a respective at least one utility meter and adapted to transmit utility consumption data for reception by an automatic meter reading (AMR) system that forwards the utility consumption data to a central station; and
   at least one utility display module, the utility display module configured to receive the transmitted utility consumption data, to display only utility consumption-based data that is unique to the customer of the at least one utility, and to wirelessly transmit the consumption data to the AMR system.

23. The system of claim 22, further including at least one utility metering device adapted to transmit utility consumption data being operably coupled to an appliance consuming a utility.

24. The system of claim 22, wherein the utility display module comprises:
   communication circuitry configured to receive the transmitted utility consumption data;
   a display adapted to display the utility consumption-based data to the user;
   control circuitry operably coupled to the communication circuitry and to the display, the control circuitry adapted to control the receipt of the utility consumption data and the display of the utility consumption-based data to a user;
   power circuitry operably coupled to the control circuitry to regulate a flow of power thereto; and
   a housing to house the control circuitry, communication circuitry, power circuitry and display.

25. The system of claim 23, wherein the utility metering device includes at least one communication device selected from the group consisting of: a Bluetooth connectivity device, and a wireless fidelity (Wi-Fi) device.

26. The system of claim 24, further including circuitry operably coupled to the control circuitry and adapted to measure at least one environmental parameter, wherein the control circuit analyzes the utility consumption data based on the at least one environmental parameter to identify a possible correlation therebetween.

27. The system of claim 26, wherein the circuitry is adapted to measure at least one measurable environmental parameter selected from the group consisting essentially of indoor temperature, outdoor temperature, indoor humidity, outdoor humidity, wind speed, wind direction, and barometric pressure.

28. In an automatic meter reading (AMR) system that includes a plurality of endpoint devices interfaced with utility metering devices and at least one reading device that reads consumption-related data from endpoint devices, the AMR system comprising:
   an apparatus that is based in a premises associated with a customer of a utility service, wherein the apparatus obtains and displays utility consumption-related data for viewing by a user associated with the customer, the apparatus being configured to: obtain consumption-related data from a wireless transmission by a corresponding at least one endpoint device that is transmitted for reception by the at least one reading device; limit display of the consumption-related data to data that is relevant to only the customer; and engage in communications with at least one of the at least one reading device.

29. The apparatus of claim 28, wherein the consumption-related data includes at least one set of data selected from the group consisting of: monitored status data, billing-related data, and pricing-related data.

30. The apparatus of claim 28, wherein the apparatus is configured to operate as a data collection point for at least one endpoint device.

31. The apparatus of claim 28, wherein the apparatus is configured to communicate received consumption-related data via a communication port.

32. The apparatus of claim 28, wherein the apparatus is configured to communicate with the at least one of the at least one reading device to facilitate transmission of consumption-related data to the AMR system.

33. The apparatus or claim 28, wherein the apparatus is configured to communicate with the at least one of the at least one reading device to receive information from the AMR system.

34. The apparatus of claim 28, wherein the endpoint devices include ERT modules.

35. The apparatus of claim 28, wherein the apparatus is configured to display only the utility consumption-related data that is relevant to the customer of the utility service.

36. The apparatus of claim 1, wherein:
   the apparatus is based in a premises associated with the customer of the utility service;
   the apparatus is situated remotely from at least one endpoint device based in the premises and associated with the customer of the utility service; and
   the apparatus is configured to wirelessly communicate with the at least one endpoint device based in the premises.

37. An automatic meter reading (AMR) system, comprising:
   a first utility meter endpoint device associated with a first customer who is responsible for billings to a utility service provider, wherein the first utility meter endpoint device wirelessly transmits utility consumption-related information in a first transmission;
   a reading device that receives the first transmission and communicates the utility consumption-related information to a central station associated with the utility service provider; and
   a customer informing apparatus associated with the first customer and situated remotely from the first utility meter endpoint, wherein the customer informing apparatus displays only customer-informing information tat is relevant to the first customer, and wherein the customer-informing information is based at least in part on the utility consumption-based information from the first transmission.

38. The AMR system of claim 37, wherein the customer-informing apparatus receives the first transmission and produces the customer-informing information based on the consumption-related information contained in the first transmission.

39. The AMR system of claim 37, wherein the customer-informing apparatus wirelessly communicates with the reading device.

40. In an automatic meter reading (AMR) system serving a utility service provider, a method for informing a customer of the utility service provider regarding utility usage relevant to the customer, the method comprising:

deploying a remote display apparatus to be maintained under at least partial control by the customer;

transmitting, by a utility meter endpoint device associated with the customer, a first wireless transmission to the utility service provider via the AMR system, wherein the first wireless transmission includes utility consumption-related information specific to the customer;

receiving, by the remote display apparatus, the first wireless transmission; and displaying, by the remote display apparatus, utility usage-related information unique to the customer.

41. The method of claim 40, further comprising:

producing, by the remote display apparatus, the utility usage-related information based on the utility consumption-related information of the first wireless transmission.

* * * * *